United States Patent [19]

Hen

[11] Patent Number: 5,059,333

[45] Date of Patent: Oct. 22, 1991

[54] DISSOLUTION OF SULFATE SCALES

[75] Inventor: John L. Hen, Skillman, N.J.

[73] Assignee: Mobil Oil Corporation, Fairfax, Va.

[21] Appl. No.: 558,963

[22] Filed: Jul. 26, 1990

[51] Int. Cl.$^5$ .................. E21B 43/12; E21B 41/02
[52] U.S. Cl. .................. 252/8.552; 252/8.555;
252/80; 252/82; 252/146; 252/147; 252/148;
252/180; 252/389.2; 252/359.22; 252/390;
252/392; 166/279; 166/300; 422/15; 422/17
[58] Field of Search .................. 252/8.552, 8.555, 80,
252/82, 146, 147, 148, 180, 389.2, 389.22, 390,
392; 422/15, 17; 166/279, 300

[56] References Cited

U.S. PATENT DOCUMENTS

| | | | |
|---|---|---|---|
| 2,396,938 | 3/1946 | Bersworth | 252/180 |
| 3,660,287 | 5/1972 | Quattrini | 252/8.552 |
| 3,886,204 | 5/1975 | Geffers et al. | 252/147 X |
| 3,933,427 | 1/1976 | Bohnsack et al. | 252/180 X |
| 3,965,024 | 6/1976 | Schmadel et al. | 252/95 |
| 4,209,398 | 6/1980 | Ii et al. | 422/15 |
| 4,229,409 | 10/1980 | Scharf et al. | 422/15 X |
| 4,240,925 | 12/1980 | Tait | 252/8.552 |
| 4,351,796 | 9/1982 | Marshall | 422/15 |
| 4,446,046 | 5/1984 | Becker | 252/180 X |
| 4,497,713 | 2/1985 | Geiger | 422/15 X |
| 4,563,284 | 1/1986 | Amjad | 252/8.552 X |
| 4,621,694 | 11/1986 | Wilson | 252/8.552 |
| 4,708,805 | 11/1987 | D'Muhala | 252/180 X |
| 4,778,655 | 10/1988 | Greaves | 422/15 |

OTHER PUBLICATIONS

R. H. Ashcraft, "Scale Inhibition Under Harsh Conditions by 2-Phosphonobutane-1,2,4-Tricarboxylic Acid (PBTC)", NACE (National Association of Corrosion Engineers), Paper No. 123, Boston, MA 3/29/85.

Primary Examiner—Robert L. Stoll
Assistant Examiner—Chhaya Sayala
Attorney, Agent, or Firm—Alexander J. McKillop; Charles J. Speciale; Malcolm D. Keen

[57] ABSTRACT

The invention provides for the use of compositions to dissolve sulfate scales from surfaces containing these scales, comprising an aqueous solution of an aminopolycarboxylic acid (APCA) containing 1 to 4 amino groups, e.g., diethylenetriaminepentaacetic acid (DTPA) or ethylenediaminetetraacetic acid (EDTA), or a salt thereof, and 2-phosphonobutane-1,2,4-tricarboxylic acid (PBTC) or a salt thereof. More particularly, the invention encompasses a method of removing sulfate scales from surfaces on which they have formed utilizing the foregoing solutions, particularly the removal of scales from equipment and wellbore surfaces associated with the operation of crude oil and gas wells.

18 Claims, 1 Drawing Sheet

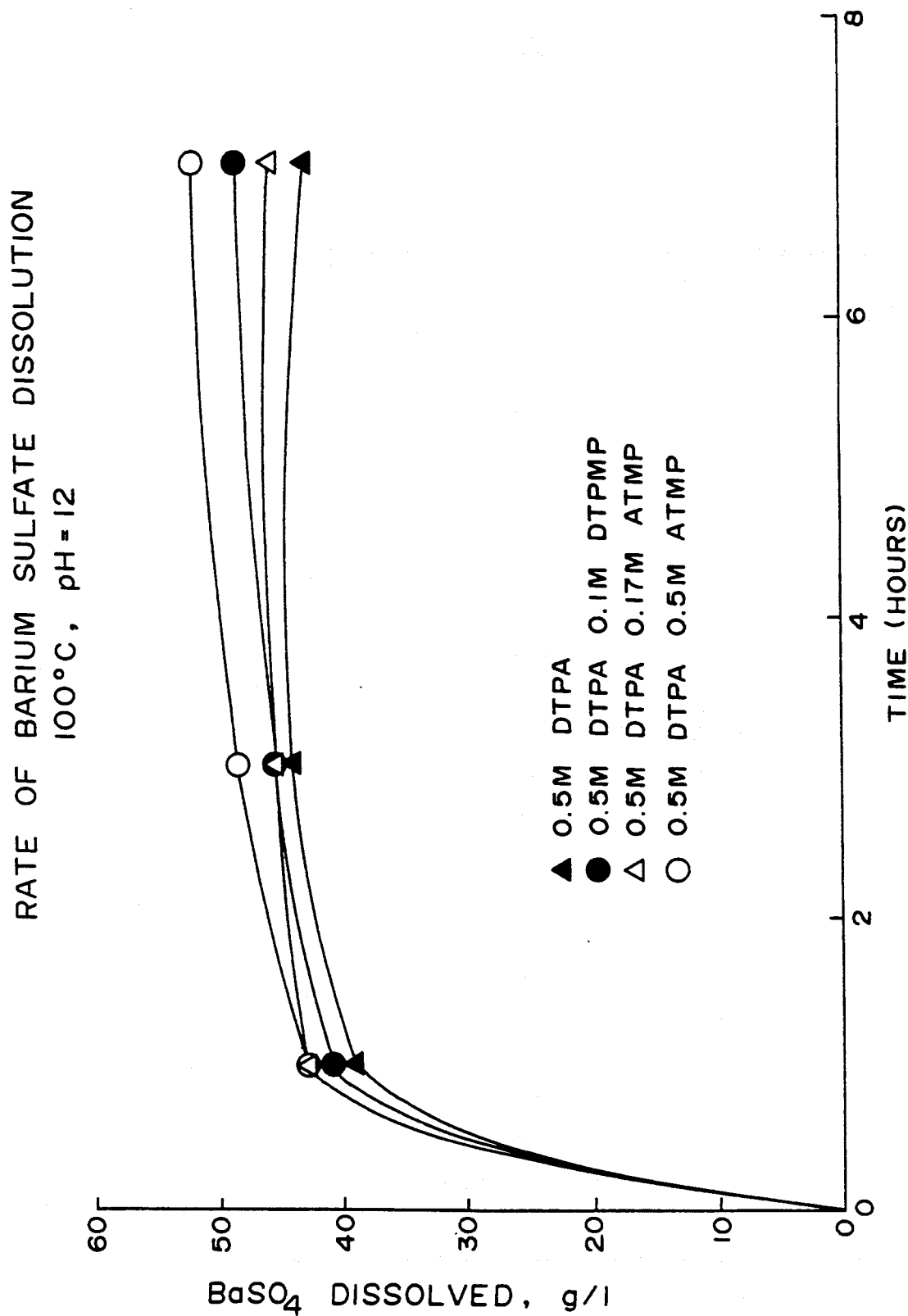

DISSOLUTION OF SULFATE SCALES

BACKGROUND OF THE INVENTION

1. Field of the Invention

The invention relates to a method of dissolving sulfate scales from surfaces such as the equipment and wellbore surfaces of oil and gas wells.

2. Background Information and Description of Related Art

Sulfate scales normally form as a result of the mixing of incompatible waters. This may occur during crude oil and gas production when sea water containing sulfate and bicarbonate ions is mixed with reservoir water containing alkaline earth metal cations (barium, calcium and strontium). Depending on surrounding conditions such as pH, temperature, pressure and the presence of a seed crystal, if the concentrations of alkaline earth cations and sulfate ions exceed the solubility of the corresponding alkaline earth sulfates, the sulfate will precipitate and form scales. Under these conditions, the scales may also form with a single source of water containing supersaturated levels of alkaline earth metal and sulfate ions.

Adherent and occluded scales cause serious problems in many applications involving water flow. For example, during gas and oil production, scale plugging of surface and subsurface equipment, tubings, and perforations often lead to severe productivity decline and difficult operating conditions. Of the sulfate scales, barium sulfate is particularly troublesome because of its extreme insolubility. Furthermore, barium sulfate is often associated with strontium sulfate which may carry traces of radium with its potentially dangerous property of radioactivity.

Various methods have been proposed for the removal of sulfate scales including mechanical and chemical treatments. The latter treatments include contacting the scale with any of various agents in which the scale will dissolve, such as solutions of an aminopolycarboxylic acid (APCA), e.g. diethylenetriaminepentaacetic acid (DTPA) or ethylendiaminetetraacetic acid (EDTA), which acts as a sequestrant. However, while the APCA's are somewhat effective in dissolving sulfate scales, including barium sulfate, further increases in both the rate of dissolution and the amount of scale dissolved are considered highly desirable from the standpoint of increased productivity. Thus any method yielding such improvement, particularly with regard to barium and strontium sulfate scales, could be of considerable importance.

Various improvements in the dissolution of sulfate scales have been proposed, some of which are disclosed in the following prior art references which are cited and described herein in accordance with the terms of 37 CFR 1.56, 1.96 and 1.98.

U.S. Pat. No. 3,660,287, issued May 2, 1972 to Quattrini, discloses the removal of scale including calcium and barium sulfates from oil well equipment by treating it with a composition comprising a partially neutralized aminopolyacetic acid, e.g., DTPA or EDTA, and a carbonate such as ammonium bicarbonate.

U.S. Pat. No. 4,708,805, issued Nov. 24, 1987 to D'Muhala, discloses the removal of barium and strontium sulfate scales by treatment with a sequestering composition comprising citric acid, a polycarbazic acid, and an alkylenepolyaminopolycarboxylic acid, e.g., DTPA or EDTA.

U.S. Pat. No. 4,621,694, issued Nov. 11, 1986 to Wilson et al., discloses a method for removing scale from wellbore surfaces and equipment utilizing a composition comprising an external aqueous phase in which is emulsified a hydrocarbon membrane phase enveloping an internal aqueous phase, with the hydrocarbon and internal aqueous phases containing different complexing agents.

R. H. Ashcraft, "Scale Inhibition Under Harsh Conditions by 2-Phosphonobutane-1,2,4-tricarboxylic Acid (PBTC)", NACE, (National Association of Corrosion Engineers), Paper No. 123, Boston, MA, Mar. 29, 1985, discloses the use of PBTC as a threshold scale inhibitor in preventing or minimizing the formation of calcium carbonate scales. A threshold scale inhibitor is a compound capable of preventing scale formation at concentrations far below that required to sequester the scale compound which is necessary for dissolution.

SUMMARY OF THE INVENTION

In accordance with this invention, new compositions are provided for the dissolution of sulfate scales from surfaces containing these scales, such compositions comprising an aqueous solution of an aminopolycarboxylic acid (APCA) containing 1 to 4 amino groups, e.g., diethylenetriaminepentaacetic acid (DTPA) or ethylenediaminetetraacetic acid (EDTA), or a salt thereof, and 2-phosphonobutane-1,2,4-tricarboxylic acid (PBTC) or a salt thereof. The invention also encompasses a method of removing sulfate scales from surfaces on which they have formed utilizing the foregoing solutions. While the inventive compositions can be utilized for the dissolution of sulfate scales from any source, they are particularly useful in the removal of such scales which form on equipment and wellbore surfaces in the production of crude oil and gas due to the mixing of incompatible waters.

DESCRIPTION OF THE DRAWING

The drawing shows curves which indicate the effect on barium sulfate dissolution of solutions of DTPA alone, PBTC alone and, combinations of DTPA and PBTC.

DESCRIPTION OF PREFERRED EMBODIMENTS

The solution used to dissolve the sulfate scale may contain concentrations of an APCA or salt thereof and PBTC or salt thereof of, for example, about 0.1 to 1.0 M, preferably about 0.3 to 0.6M of each material. The APCA and PBTC may be added in the form of the free acids or as salts, preferably the potassium salts. However, if added as the free acid, it is desirable to add a basic material, e.g., potassium or cesium hydroxide or carbonate, preferably potassium hydroxide, to at least partially change the free carboxyl groups to anionic carboxylate, i.e., salt groups. Whether the APCA and PBTC are added as salts or as free acids which are reacted with a basic material in situ, it is preferred that the solution applied to the scale have a basic pH, e.g. about 8 to 14, more preferably about 11 to 13.

The sulfate scale intended to be dissolved under this invention contains a substantial proportion, e.g., at least about 15 wt.% of alkaline earth metal sulfates, i.e., sulfates of calcium, strontium, barium and in many cases a trace amount of radium. Other scale forming compounds such as calcium carbonate and other alkaline earth carbonates are often also present. The inventive method is particularly useful for the dissolution of sulfate scales wherein the alkaline earth metal sulfates comprise a significant proportion, e.g., at least about 50 wt.%, of barium sulfate which is particularly insoluble and difficult to remove by hitherto known methods.

While an aqueous solution of APCA and PBTC can be used as is to dissolve the sulfate scale in many situations, it may be advantageous in some instances to employ such solutions as part of a liquid membrane system, as described in previously cited U.S. Pat. No. 4,621,694, the entire disclosure of which is incorporated by reference. As previously described, this type of system involves a composition comprising an external aqueous phase in which is emulsified a hydrocarbon membrane phase enveloping an internal aqueous phase. The external aqueous phase may contain a relatively weak chelating or complexing agent such as the sodium salt of EDTA; the hydrocarbon membrane phase contains a complexing agent stronger than any which may be present in the external aqueous phase, e.g., a di-long chain alkylnaphthalene sulfonic acid such as dinonylnaphthalene sulfonic acid, didecylnaphthalene sulfonic acid, or didodecylnaphthalene sulfonic acid; and the internal aqueous phase contains a complexing agent stronger than in the hydrocarbon membrane phase, e.g., a pentasodium salt of DTPA.

As an embodiment of the invention claimed herein, the described liquid membrane system contains as the internal aqueous phase a solution of an APCA and PBTC or salts thereof as hereinbefore disclosed. In practice, the components of the sulfate scale contacted by the emulsion tend to dissolve in the external aqueous phase, such dissolution aided by any relatively weak complexing agent which is present. The dissolved alkaline earth metal ions then tend to migrate to the hydrocarbon membrane phase because of the greater complexing power of the agent contained in such membrane phase. Finally, the ions tend to migrate from the membrane phase to the internal aqueous phase because of the still greater complexing power of the agent in the latter phase. This type of membrane system can have greater dissolving power than a straight solution of the relatively strong complexing agent utilized in the internal aqueous phase because the described migration of the alkaline earth metal ions prevents the concentration of such ions from building up too quickly in the external aqueous phase thus allowing for their dissolution over a longer period of time. Moreover, the use in the internal aqueous phase of the combination of APCA and PBTC rather than other agents such as the APCA alone provides for more efficient scale removal by the system because of the greater dissolving and complexing power of such combination. Note that the choice of APCA in the combination of agents utilized in the internal aqueous phase may depend on the strength of the agents employed in the external aqueous and hydrocarbon membrane phases. Thus if an EDTA salt is employed as the agent in the external aqueous phase as illustrated in U.S. Pat. No. 4,621,694 previously cited, then the APCA used in the combination of agents employed in the internal aqueous phase will generally be stronger than the EDTA salt. e.g., a DTPA salt.

In dissolving sulfate scale from surfaces under this invention, the scale may be contacted with the composition comprising APCA and PBTC using any means known in the art. For example, in the case of an oil or gas well, the composition may be injected into the wellbore and through the tubular equipment, e.g., piping, casing, etc., and passageways, which have been fouled by the scale, optionally after being preheated, e.g., to a temperature between about 25° C. to about 100° C., although the temperatures prevailing downhole may make preheating unnecessary. Once within the tubular goods and the passageways requiring treatment, the composition may be allowed to remain there for a period of time to dissolve all or a significant proportion of the scale, e.g., about 10 minutes to about 7 hours. After being in contact with the equipment for the desired time, the solution containing the dissolved scale is withdrawn and may be discarded or re-injected into the subsurface formation as is or after treatment to remove dissolved ions and/or adding more APCA and PBTC. This procedure can be repeated as often as required to remove scale from the equipment.

In one procedure for circulating the composition through the tubular goods in the well, the composition is pumped down through the production tubes and returned to the surface through the annular space between the production tubes and the casing (or vice versa). Also, the composition may be pumped down through the production tubing and into the formation, thereby cleaning the well, including the well casing, and the formation pore space by dissolving sulfate scale present as it flows over and along the surfaces that need cleaning. The spent composition containing the dissolved, complexed barium together with any other alkaline earth metal cations which may have been present in the scale, including radium, may then be returned to the surface, for example, by displacement or entrainment with the fluids that are produced through the well after the cleaning operation. In an alternative manner, the composition may be applied batchwise fashion, for example, by injecting the composition into the well and optionally into the pore spaces of the adjacent earth formation and there keeping the composition in contact in non-flowing condition with the surfaces that are covered with scale, for a period of time sufficient to dissolve the scale.

In another embodiment of the inventive method of scale removal, removable production equipment containing such scale may be placed in a vessel and completely immersed in the composition until the scale is dissolved.

The present scale removal technique is very effective for lowering residual radioactivity of equipment contaminated with radium-containing barium sulfate scale. Thus, radium may be precipitated in scale with other alkaline earth metals with the result that scaled equipment is often radioactive to the point that it cannot safely be used. Using the present scale removal compositions, activity can be reduced to acceptable levels in comparatively short times without further treatment. Some residual activity arises from lead and other radioisotopes which are not dissolved in the composition; these isotopes are decay products of radium and have originally been incorporated in the scale with the radium and other alkaline earth metal sulfates. Although they are not removed chemically by the present scale removal techniques, the dissolution of the barium scale together with the other alkaline earth metal sulfates enables these other components of the scale to be removed by simple abrasion, for example, by scrubbing with or without a detergent/water scrub solution. In this way, the residual activity level may be reduced to a very low value, below the appropriate regulatory standards. Thus, by using the present chemical scale removal technique in combination with a simple mechanical removal of loose, non-adherent material, previously radioactive pipe may quickly and readily be restored to useful, safe condition.

Although the invention has been described primarily with respect to the removal of sulfate scales from the equipment and surfaces connected with oil and gas wells, it can also be applied to other surfaces prone to the formation of such scales, e.g., the interior surfaces of boilers, heat exchangers, condensers, flow lines, treaters, cooling towers, internal combustion engines, and other equipment utilized in operations necessitating the handling of large amounts of water such as pulp and paper mills and certain types of mining.

In order to demonstrate the barium sulfate scale-dissolving capacities of the composition, several aqueous solutions have been examined in simulated tests, the results of which are shown in the following examples.

COMPARATIVE EXAMPLE A

This example shows the barium sulfate scale dissolving capacity of 0.5M DTPA used alone as a sequestrant.

The pH of an aqueous solution of 0.5M DTPA was adjusted to 12.0 by the addition of potassium hydroxide. A sample of this solution (150 ml) containing 60.0 g/l of barium sulfate was refluxed for 7 hours under vigorous agitation. During the run, three samples of approximately 3 to 4 grams in size were taken at 1, 3 and 7 hours. The samples were filtered while hot through a 0.45 micron Acrodisc filter and the filtered samples analyzed for barium by atomic absorption. At the end of 7 hours, the remaining contents were filtered while hot through a 0.45 micron filter. The solids were rinsed with 0.1M KOH and methanol and dried overnight at 100° C. under vacuum. The thus recovered solids were weighed indicating that the 0.5M DTPA solution dissolved 47.2 g/l of barium sulfate in 7 hours at 100° C.

COMPARATIVE EXAMPLE B

This example illustrates the relative ineffectiveness of 0.5M PBTC as a sequestrant for dissolving barium sulfate scale.

The procedure of Comparative Example A was followed except that 0.5M PBTC was used in place of DTPA. Only 0.8 g/l of barium sulfate was dissolved after 7 hours at 100° C., indicating that DTPA is about 59 times more effective than PBTC as a barium sequestrant under the typical conditions of these examples.

EXAMPLE 1

This example, included within the claimed invention, shows the unexpected improvement in barium sulfate dissolving capacity when PBTC is utilized with DTPA.

The procedure of Comparative Examples A and B was followed except that an aqueous solution of 0.5M DTPA and 0.5M PBTC was utilized. It was found that 55.7 g/l of barium sulfate was dissolved after 7 hours at 100° C., an increase of 18% over the use of 0.5M DTPA alone, and an amount substantially greater than the 48.0 g/l which would have resulted from a merely additive effect of the DTPA and PBTC shown in Comparative Examples A and B.

EXAMPLE 2

This example shows that the use of PBTC with DTPA in a concentration considerably lower than 0.5M still yields a substantial improvement in barium sulfate dissolution capacity.

The procedure of Example 1 was followed except that PBTC was used in a concentration of 0.2M with the 0.5M DTPA. The amount of barium sulfate dissolved after 7 hours at 100° C. was 50.6 g/l, still significantly more than the 47.2 g/l obtained with the use of 0.5M DTPA alone, as shown in Comparative Example A.

The results of Comparative Examples A and B and Examples 1 and 2 are graphically depicted in the drawing in which the points on the curves indicate the amounts of barium sulfate dissolved in the various solutions of the examples after 1, 3 and 7 hours of reflux at 100° C., determined by atomic absorption. The curves show that for all periods of reflux, the amounts of barium sulfate dissolved in the solutions are in the following order:

$$0.5M\ PBTC << 0.5M\ DTPA < 0.2M\ PBTC + 0.5M\ DTPA < 0.5M\ PBTC + 0.5M\ DTPA$$

The curves also show that with the three solutions comprising 0.5M DTPA, which were the only examples in which a significant amount of barium sulfate was dissolved, over 90% of the dissolution obtained after 7 hours of reflux, was achieved after the first hour.

COMPARATIVE EXAMPLES, C, D AND E

These examples illustrate that unlike the case with PBTC, various well-known polycarboxylic threshold scale inhibitors reduce rather than enhance the barium sulfate dissolving capacity of an APCA such as DTPA.

The procedure of Examples 1 and 2 was followed except that instead of PBTC, the following commercial polycarboxylic threshold scale inhibitors in 0.1N concentration were utilized with the 0.5M DTPA: phosphino-polyacrylic acid having a molecular weight of about 3500, sold under the trademark "Belsperse 161" (Example C); phosphino-polyacrylic acid having a molecular weight of about 2000 sold under the trademark "Belclene 500" (Example D); and a copolymer of acrylic acid and acrylamidopropanesulfonic acid sold under the trademark "Alcomer 74L" (Example E). The amounts of barium sulfate dissolved after refluxing at 100° C. for 7 hours are shown in the following table.

| Comparative Example | BaSO$_4$ Dissolved, g/l |
| --- | --- |
| C | 41.7 |
| D | 39.2 |
| E | 34.1 |

The results show that the use of the commerical threshold scale inhibitors used with DTPA in Comparative Examples C, D and E reduce the amount of barium sulfate dissolved by 0.5M DTPA used alone (47.2 g/l), by 11.7% for "Belsperse 161" to 27.8% for "Alcomer 74L". Thus the effect of PBTC in enhancing the barium sulfate dissolving capacity of an APCA such as DTPA is very specific and unpredictable.

I claim:

1. A composition for the removal of sulfate scale from surfaces comprising an aqueous solution of about 0.1 to 1.0 molar concentration of an aminopolycarboxylic acid (APCA) containing 1 to 4 amino groups or a salt thereof, and about 0.1 to 1.0 molar concentration of 2-phosphonobutane-1,2,4-tricarboxylic acid (PBTC) or a salt thereof as an internal phase enveloped by a hydrocarbon membrane phase which is itself emulsified in an external aqueous phase, said hydrocarbon membrane phase containing a complexing agent weaker for the cations of said sulfate scale than said APCA and PBTC, and any complexing agent for said cations in said external aqueous phase being weaker than that in said hydrocarbon membrane phase.

2. The composition of claim 1 wherein said APCA is diethylenetriaminepentaacetic acid (DTPA).

3. The composition of claim 1 wherein said APCA is ethylendiaminetetraacetic acid (EDTA).

4. A method of removing sulfate scales from surfaces on which they have formed comprising contacting said surfaces with an aqueous solution comprising about 0.1 to 1.0 molar concentration of an aminopolycarboxylic acid (APCA) containing 1 to 4 amino groups or a salt thereof, and about 0.1 to 1.0 molar concentration of 2-phosphonobutane-1,2,4-tricarboxylic acid (PBT) or a salt thereof.

5. The method of claim 4 wherein said concentration is about 0.3 to 0.6 M.

6. The method of claim 4 wherein said solution has a pH of about 8 to 14.

7. The method of claim 6 wherein said pH is about 11 to 13.

8. The method of claim 6 wherein said APCA and PBT are at least partially in the form of their potassium salts.

9. The method of claim 4 wherein said aqueous solution is an internal phase enveloped by a hydrocarbon membrane phase which is itself emulsified in an external aqueous phase, said hydrocarbon membrane phase containing a complexing agent weaker for the cations of said sulfate scale than said APCA and PBT, and any complexing agent said cations in said external aqueous phase being weaker than that in said hydrocarbon membrane phase.

10. The method of claim 4 wherein said sulfate scale comprises at least about 15 wt. % of alkaline earth metal sulfates.

11. The method of claim 10 wherein sail alkaline earth metal sulfates comprise at least about 50 wt. % of barium sulfate.

12. The method of claim 4 wherein said surfaces are equipment and wellbore surfaces associated with the operation of a crude oil or gas well.

13. The method of claim 4 wherein said APCA is DTPA.

14. The method of claim 4 wherein said APCA is EDTA.

15. The composition of claim 1 wherein the APCA in said internal aqueous phase is DTPA and said external aqueous phase contains EDTA as the sole complexing agent.

16. The composition of claim 1 wherein said complexing agent in said hydrocarbon membrane phase is dinonylnaphthalene sulfonic acid, didecylnaphthalene sulfonic acid, or didodecylnaphthalene sulfonic acid.

17. The method of claim 9 wherein said APCA in said internal aqueous phase is DTPA and said external aqueous phase contains EDTA as the sole complexing agent.

18. The method of claim 9 wherein said complexing agent in said hydrocarbon membrane phase is dinonylnaphthalene sulfonic acid didecylnaphthalene sulfonic acid, or didodecylnaphthalene sulfonic acid.

* * * * *